United States Patent
Ramsey et al.

(10) Patent No.: US 7,617,172 B2
(45) Date of Patent: Nov. 10, 2009

(54) USING PERCENTILE DATA IN BUSINESS ANALYSIS OF TIME SERIES DATA

(75) Inventors: Mark S. Ramsey, Kihei, HI (US); David A. Selby, Nr Fareham (GB); Stephen J. Todd, Hants (GB)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/609,414

(22) Filed: Dec. 12, 2006

(65) Prior Publication Data

US 2008/0140470 A1    Jun. 12, 2008

(51) Int. Cl.
*G06F 17/00* (2006.01)
(52) U.S. Cl. .............................. 706/53; 705/7; 705/38; 703/6
(58) Field of Classification Search .................. 706/53; 705/7, 38; 703/6
See application file for complete search history.

(56) References Cited

U.S. PATENT DOCUMENTS

2008/0071497 A1    3/2008    Todd

*Primary Examiner*—David R Vincent
*Assistant Examiner*—Mai T Tran
(74) *Attorney, Agent, or Firm*—Anna Linne; Hoffman Warnick LLC

(57) ABSTRACT

A real time data processing system, method and program product for processing a stream of data events. A system is provided that includes: a running profile processing system for updating a running profile each time a new data event value is inputted, wherein the running profile includes percentile data; and an analysis system for analyzing the running profile, wherein the analysis system performs a composite analysis that utilizes: (a) results obtained from comparing a new data event value to the percentile data, and (b) stored results obtained from previous compare operations.

18 Claims, 2 Drawing Sheets

USING PERCENTILE DATA IN BUSINESS ANALYSIS OF TIME SERIES DATA

FIELD OF THE INVENTION

The invention relates generally to analyzing event data, and more particularly to a system and method that uses percentile data in real time analysis of business data.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Often, it may be necessary to examine individual data events as they occur to immediately investigate any suspect behavior. Challenges however arise when analyzing data events in real time since historical data values are typically necessary to identify trends and patterns. Namely, accessing historical data can be a relatively slow process, and thus limits real time processing.

There exist various known techniques (e.g., running estimates, moving windows, etc.) for analyzing data events in real time (or near real time). In such techniques, the historical data is essentially "built in" to the currently calculated estimate, thus providing a statistical summary in a single value. Such techniques utilize little or no historical data to provide a statistical analysis of detected event values. Instead, they, e.g., maintain a running value, which is updated each time a new data event value is collected.

In some applications, such as those analyzed with a running median, comparing new values to the existing running median value may provide only limited information upon which a business analysis may occur. One approach is to calculate a standard deviation to provide more insightful analysis. However, because the overall distribution of the data events might not be Gaussian in nature, the standard deviation may be also subject to limitations.

SUMMARY OF THE INVENTION

The present invention addresses the above-mentioned problems, as well as others, by providing a system and method for processing a stream of data that includes generating one or more percentile values from a data stream and analyzing new data event values in light of the percentile values. By maintaining percentile values, various critical points can be examined as part of the business analysis. New data event values can thus be compared to the percentile, e.g., to provide a warning if there were an unusual number of purchases above or below a threshold. In addition, historical analysis results are utilized to provide further analysis of the current data event value.

In a first aspect, the invention provides a real time data processing system for processing a stream of data events, comprising: a running profile processing system for updating a running profile each time a new data event value is inputted, wherein the running profile includes percentile data; and an analysis system for analyzing the running profile, wherein the analysis system performs a composite analysis that utilizes: (a) results obtained from comparing a new data event value to the percentile data, and (b) stored results obtained from previous compare operations.

In a second aspect, the invention provides a computer program product stored on a computer readable medium, which when executed, processes a stream of data events, the computer program product comprising: program code configured for updating a running profile each time a new data event value is inputted, wherein the running profile includes percentile data; and program code configured for analyzing the running profile by performing a composite analysis that utilizes: (a) results obtained from comparing a new data event value to the percentile data, and (b) stored results obtained from previous compare operations.

In a third aspect, the invention provides a method of processing a stream of data events, comprising: updating a running profile each time a new data event value is inputted, wherein the running profile includes percentile data; and analyzing the running profile by performing a composite analysis that utilizes: (a) results obtained from comparing a new data event value to the percentile data, and (b) stored results obtained from previous compare operations.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
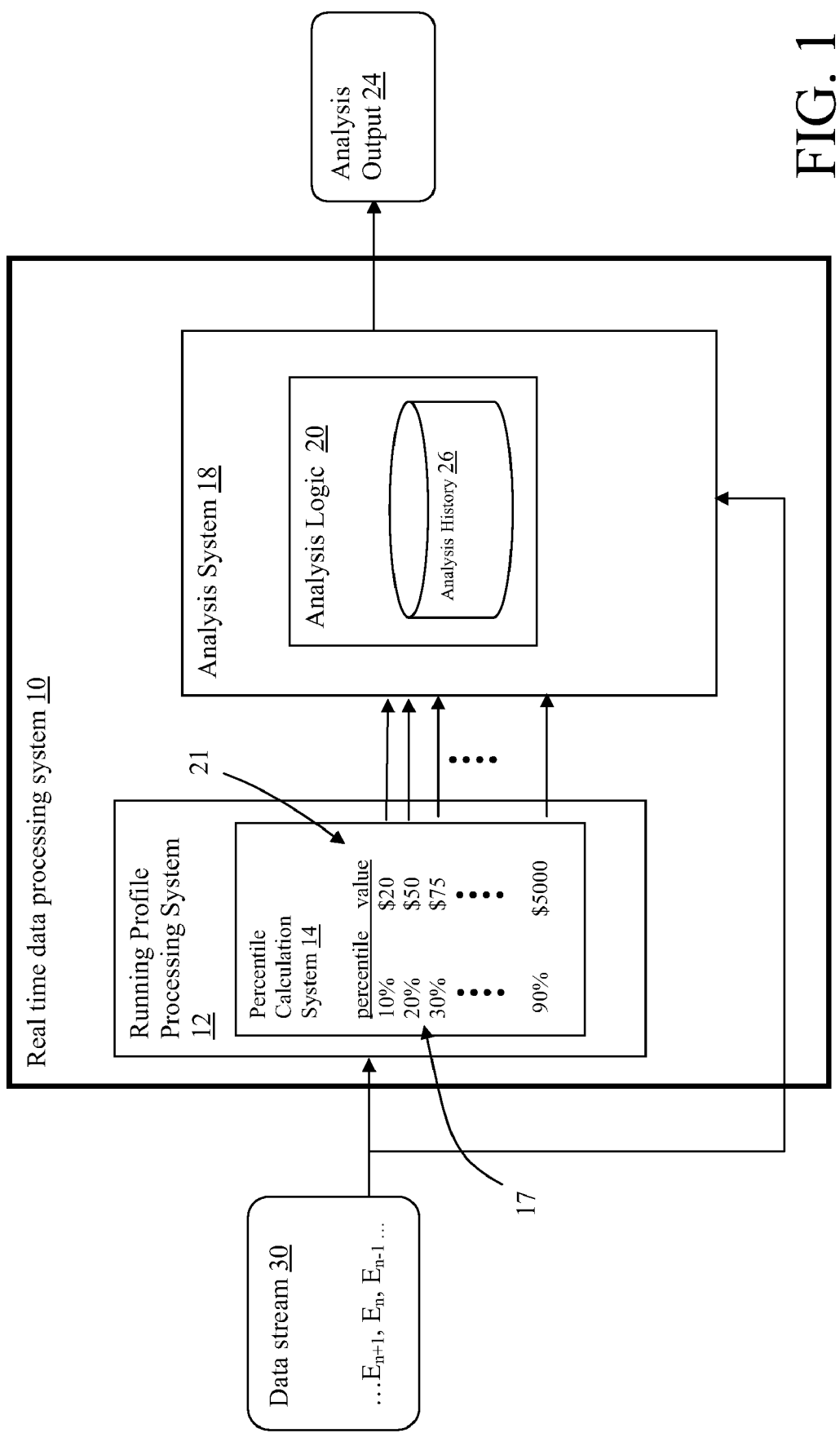
FIG. 1 depicts a real time data processing system in accordance with an embodiment of the present invention.

FIG. 1 depicts a real time data processing system 10 for processing a data stream 30. Namely, real time data processing system 10 generates a running profile that provides a statistical summary of the data stream 30, and then analyzes new data event values in light of the running profile. By utilizing a running profile, real time performance can be attained. Data stream 30 generally comprises a time series stream of data event values, with $E_n$ indicating a current data event value. Data stream 30 may originate from any source, e.g., financial information such as credit card purchase amounts, ATM withdrawal amounts, stock performance, etc.; network information such as bandwidth usage, etc.; business information such as performance data, etc.

As noted above, when the data event values from data stream 30 are not Gaussian in nature, statistical measures, such as a running mean and/or running standard deviation may be inadequate to fully analyze new data event values $E_n$. For example, credit card transactions for a certain type of customer may include mostly lower dollar amount purchases (e.g., $20-50), with a few large transactions ($500-1500), and relatively none in between. A running mean could not capture this type of behavior.

To address this, real time data processing system 10 utilizes percentile data to better capture the behavior of the data stream 30. As each new data event value $E_n$ streams into real time data processing system 10, the value is processed by running profile processing system 12 that maintains a running profile for the data stream 30. In the example shown in FIG. 1, running profile processing system 12 includes a percentile calculation system 14 for calculating/maintaining percentile data. Percentile data generally includes a set of running percentile values 21 (or boundaries) for associated percentiles 17 (or percentile ranges). Thus, in the example depicted in FIG. 1, the $10^{th}$ percentile includes an associated running percentile value of $20, the $20^{th}$ percentile includes an associated running percentile value of $50, etc. Each time a new event value $E_n$ is inputted, or from time to time, percentile calculation system 14 recalculates the running percentile values 21 for the given percentiles. The number of percentiles maintained by percentile calculation system 14 can vary depending upon the particular needs of the system.

Any methodology may be utilized to manage and implement percentile calculation system 14. In one illustrative embodiment, a plurality of simulated running percentiles 17 is maintained. Each simulating running percentile 17 includes a fixed percentile and a changing percentile value, which is calculated based on a previously calculated percentile value. Simulating running percentiles 17 are useful in providing real time (or near real time) results since they require very little memory and computational power. An illustrative algorithm for calculating a new simulated running percentile value $X_n$ (i.e., boundary for an associated percentile) is as follows:

$$\text{If } E_n > X_{n-1} \text{ then } X_n = X_{n-1} + K1, \text{ else } X_n = X_{n-1} - K2,$$

where $X_{n-1}$ is a previously calculated percentile value and K1 and K2 are utilized to set the percentile.

An adjustment function is provided for a positive adjustment of the simulated value to approximate a selected percentile (referred to as simulated value PEst). Another adjustment function is provided for the negative adjustment of the simulated value PEst. These different adjustment functions or adjustment values K1/K2 can be applied so as to bias the simulated value PEst to simulate a desired running percentile other than the median, e.g., the Xth percentile for some selected number X in the range between 0 and 100. If the ratio of a first adjustment value to a second adjustment value is the same as the ratio between (a) the selected number and (b) 100 minus the selected number (i.e., the ratio between X and 100-X), the simulated value will be biased to represent that Xth percentile. The ratio of the first and second adjustment values is not dependent on the input data values. For example, a first adjustment value K1 of 4 (a positive increment of 4 when the input value is greater than the current value of PEst) and a second adjustment value K2 of 1 (decrementing by 1 when the input value is less than PEst), will result in an approximation to the running 80th percentile value. Accordingly, using this technique, one or more running percentile values can be readily calculated and maintained by percentile calculation system 16.

Analysis system 18 is provided to compare a current data event value $E_n$ with the percentile data to determine if $E_n$ is potentially problematic, i.e., does $E_n$ fall outside a percentile range of what would be expected, etc. In some instances, compound inquiries can be made. For example, in the case of the credit card transactions discussed above, the analysis system 18 may look to determine if the current data event value $E_n$ either falls below a first percentile (e.g., $30^{th}$ percentile) or above a second percentile (e.g., $80^{th}$ percentile).

In addition to utilizing percentile data 40 to analyze $E_n$, analysis logic 20 may utilize analysis history 26 to yield more comprehensive analysis results. For instance, analysis logic 20 may be configured to look for trending data, e.g., if $E_{n-2}$ was above the $50^{th}$ percentile, $E_{n-1}$ was above the $75^{th}$ percentile, and $E_n$ is above the 90th percentile, then a warning or exception could be issued as part of the analysis output 24.

Figure 2:
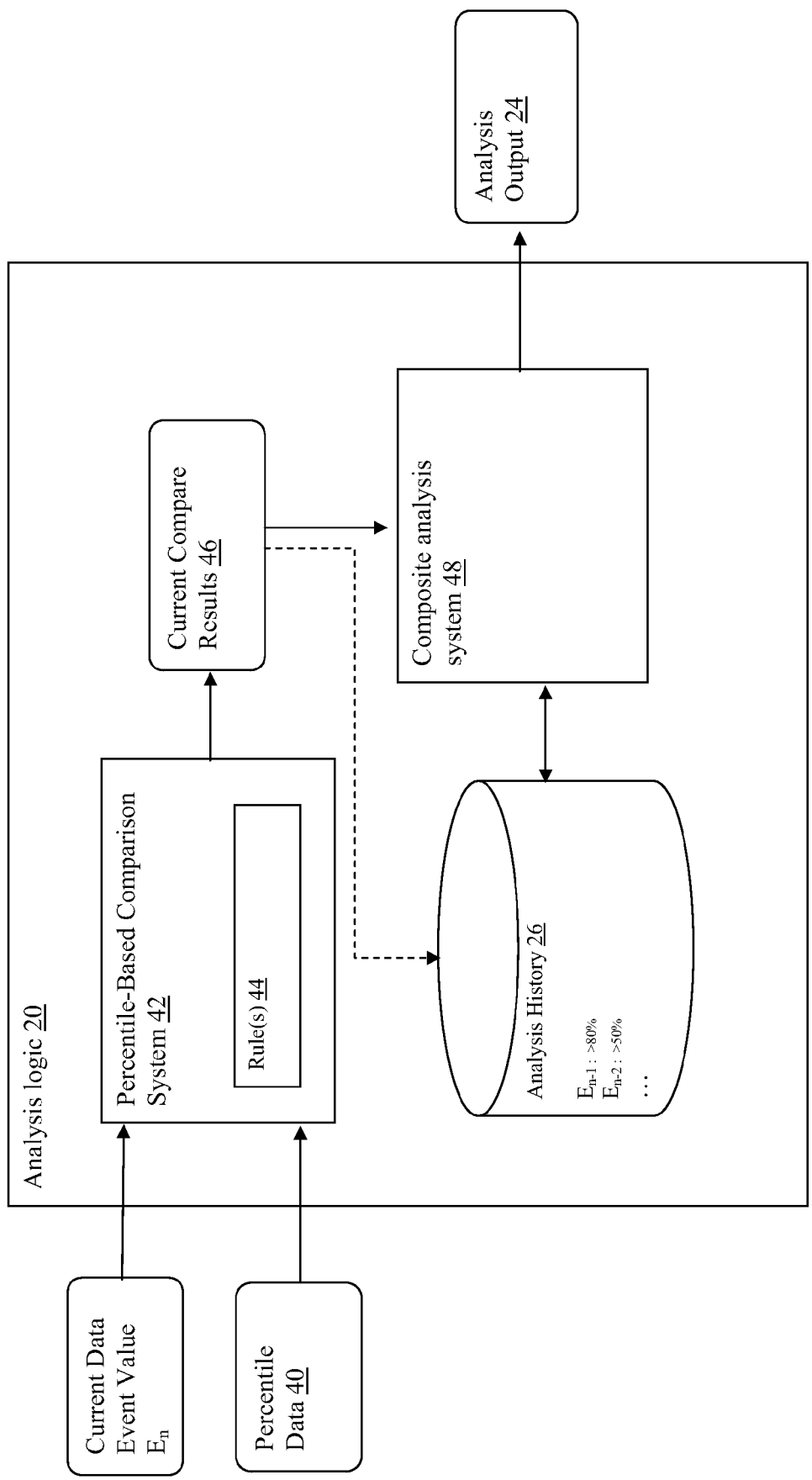
FIG. 2 depicts analysis logic in accordance with an embodiment of the present invention.

FIG. 2 depicts an illustrative implementation of analysis logic 20 that utilizes analysis history 26. When a current data event value $E_n$ is obtained, it, along with percentile data 40 is processed by percentile-based comparison system 42 based on a set of rules 44. For example, percentile-based comparison system 42 may determine if the current data event value $E_n$ is above a first percentile, and below a second percentile. The rules 44 for determining comparison operations and percentile values may be set in any manner. From this operation, current compare results 46 are generated, which are both stored in analysis history 26 and fed into a composite analysis system 48 that considers both the current compare results 46, and historical compare results from analysis history 26. Historical compare results 46 may include any information gathered from previous compare operations, e.g., $E_{n-1} > 80^{th}$ percentile, etc.

Historical compare results 46 may be utilized in any fashion to analyze event data. For example, historical compare results 46 could be used to determine if previous data event values were above or below one ore more percentiles, e.g., if three consecutive data event values fell below a $20^{th}$ percentile, then a warning could be issued. Alternatively, composite analysis system 48 could identify trending data, e.g., if each of the percentile ranges for the last five data event values increased by at least five percent, a warning could be issued. In other cases, large swings in data values might be of interest. For example, if a current data event value was above the $80^{th}$ percentile, and a previous value was below the $20^{th}$, a warning could be issued. In other cases, comparisons with other types of statistical information, such as a running mean and or standard deviation could be incorporated as part of the analysis. Obviously, the type of analysis done by composite analysis system 48 would depend on the particular application, and such variations fall within the scope of the invention.

In addition to generating percentile data 40, running profile processing system 12 (FIG. 1) could generate other types of statistical information, such as a running mean and standard deviation. Such information could be useful if, for instance, it was determined that the data stream 30 was known to behave in a Gaussian nature. Any technique can be utilized for calculating a running mean. In one illustrative embodiment, runnings mean $RV_n$ could be calculated as follows:

$$RV_n = (1-K) * E_n + K * RV_{n-1},$$

where the constant K provides a half-life value chosen between 0 and 1. In accordance with this equation, the running mean is calculated based on the current data event value $E_n$ and the previously calculated running mean $RV_{n-1}$. Thus, no historical data (except for the previously calculated running mean) needs to be stored and retrieved. Additional values, such as a running standard deviation RSD can also be calculated as follows:

$$RSD = \text{sqrt}(RVV - RV_n^2),$$

where RVV is a running square defined as $RVV = (1-K) * E_n^2 + K * RV_n$. Analysis logic 20 could then use the running mean and standard deviation in addition to the percentile data 40 to further analyze data event values.

In general, real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage (i.e., computer readable medium), including magnetic media, optical media, random access memory (RAM), read-only memory (ROM), a data cache, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time data event processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A real time data processing system for processing a stream of data events, comprising:
   a computer device having:
   a running profile processing system for updating a running profile each time a new data event value is inputted, wherein the new data event value an inputted financial transaction amount, and wherein the running profile includes percentile data that provides percentile ranges for associated financial transaction amounts;
   an analysis system for analyzing the running profile, wherein the analysis system performs a composite analysis that utilizes: (a) results obtained from comparing a new data event value to the percentile data, and (b) stored results obtained from previous compare operations; and
   outputting an analysis result relating to the inputted financial transaction amount.

2. The real time data processing system of claim 1, wherein the percentile data is calculated using simulated percentiles.

3. The real time data processing system of claim 2, wherein the simulated percentiles are calculated according to an algorithm:

if $E_n > X_{n-1}$ then $X_n = X_{n-1} + K$, else $X_n = X_{n-1} - K$, wherein, $E_n$ is a current data event value, $X_n$ is a current simulated percentile,
   $X_{n-1}$ is a previously calculated simulated percentile, and K is an adjustment factor selected to generate a predetermined percentile.

4. The real time data processing system of claim 1, wherein the percentile data comprises a histogram comprising a plurality of percentile ranges, each percentile defined by a boundary value, and each percentile range having a number of counts associated therewith.

5. The real time data processing system of claim 1, wherein the analysis system outputs a warning if a predetermined condition for both a current compare operation and a previous compare operation are met.

6. The real time data processing system of claim 1, wherein the stream of data events is selected from the group consisting of: financial data, business data, and network data.

7. A computer readable medium comprising:
   a computer program product stored on the computer readable medium, which when executed, processes a stream of data events, the computer program product further comprising:
   program code for updating a running profile each time a new data event value is inputted, wherein the new data event value includes an inputted financial transaction amount and wherein the running profile includes percentile data provides percentile ranges for associated financial transaction amounts;
   program code for analyzing the running profile by performing a composite analysis that utilizes: (a) results obtained from comparing a new data event value to the percentile data, and (b) stored results obtained from previous compare operations; and
   program code for outputting an analysis result relating to the inputted financial transaction amount.

8. The computer program product of claim 7, wherein the percentile data is calculated using simulated percentiles.

9. The computer program product of claim 8, wherein the simulated percentiles are calculated according to an algorithm:

$$\text{if } E_n > X_{n-1} \text{ then } X_n = X_{n-1} + K, \text{ else } X_n = X_{n-1} - K,$$

wherein, $E_n$ is a current data event value, $X_n$ is a current simulated percentile, $X_{n-1}$ is a previously calculated simulated percentile, and K is an adjustment factor selected to generate a predetermined percentile.

10. The computer program product of claim 7, wherein the percentile data comprises a histogram comprising a plurality of percentile ranges, each percentile defined by a boundary value, and each percentile range having a number of counts associated therewith.

11. The computer program product of claim 7, wherein a warning is generated if a predetermined condition for both a current compare operation and a previous compare operation are met.

12. The computer program product of claim 7, wherein the stream of data events is selected from the group consisting of: financial data, business data, and network data.

13. A method of processing a stream of data events, comprising;
    utilizing a computer device to update a running profile each time a new data event value is inputted, wherein the new data event value includes a financial transaction and wherein the running profile includes percentile data that provides percentile ranges for associated financial transaction amounts; and
    utilizing the computer device to analyze the running profile by performing a composite analysis that utilizes: (a) results obtained from comparing a new data event value to the percentile data, and (b) stored results obtained from previous compare operations.
    utilizing the computer device to output an analysis result relating to the inputted financial transaction amount.

14. The method of claim 13, wherein the percentile data is calculated using simulated percentiles.

15. The method of claim 14, wherein the simulated percentiles are calculated according to an algorithm:

$$\text{if } E_n > X_{n-1} \text{ then } X_n = X_{n-1} + K, \text{ else } X_n = X_{n-1} - K,$$

wherein, $E_n$ is a current data event value, $X_n$ is a current simulated percentile, $X_{n-1}$ is a previously calculated simulated percentile, and K is an adjustment factor selected to generate a predetermined percentile.

16. The method of claim 13, wherein the percentile data comprises a histogram comprising a plurality of percentile ranges, each percentile defined by a boundary value, and each percentile range having a number of counts associated therewith.

17. The method of claim 13, wherein a warning is generated if a predetermined condition for both a current compare operation and a previous compare operation are met.

18. The method of claim 13, wherein the stream of data events is selected from the group consisting of: financial data, business data, and network data.

* * * * *